United States Patent [19]

Gulczynski

[11] Patent Number: 4,949,234
[45] Date of Patent: Aug. 14, 1990

[54] HIGH EFFICIENCY POWER FACTOR CORRECTION CIRCUIT

[76] Inventor: Zdzislaw Gulczynski, P.O. Box 441, Winchester, Mass. 01890

[21] Appl. No.: 338,328

[22] Filed: Apr. 17, 1989

[51] Int. Cl.$^5$ .......................................... H02M 3/335
[52] U.S. Cl. ........................................ 363/48; 363/89; 363/126; 363/86
[58] Field of Search ............... 363/37, 39, 44, 45, 363/46, 47, 48, 86, 89, 126

[56] References Cited

U.S. PATENT DOCUMENTS 4,405,889  9/1983  Overstreet et al. .................... 363/86

FOREIGN PATENT DOCUMENTS 55-102022  8/1980  Japan ..................................... 363/37
57-132766  8/1982  Japan ..................................... 363/48
58-37717   3/1983  Japan ..................................... 363/47
1179498    9/1985  U.S.S.R. ............................... 363/126

Primary Examiner—Peter S. Wong

[57] ABSTRACT

The power factor correction circuit can deliver a high output power, high efficiency and high power factor. AC, e.g. line, voltage is converted into DC voltage. The high power and high efficiency are achieved by using diodes as only semiconductor devices conducting higher average currents. The correction circuit has an input and output. A rectifier network is coupled to the input for providing a pair of rectified signals. One rectified signal is applied to the output. A capacitor stores a DC voltage. A charging circuit selectively applies the other rectified signal to the capacitor. A diode applies the DC voltage to the output. A sinusoidal input current can be obtained. Inrush and surge currents are eliminated.

10 Claims, 2 Drawing Sheets

HIGH EFFICIENCY POWER FACTOR CORRECTION CIRCUIT

CROSS REFERENCE TO RELATED INVENTIONS

This application is related to:
"Capacitive Load Driver with Binary Output" Ser. No. 474,488 filed 02/02/90;
"3-Terminal Bidirectional Switching Power Supply with AC or DC Input and AC or DC Output" Ser. No. 444,729 filed 12/01/89;
"Switching Power Supply with Constant or Sinusoidal Input Current and with Fixed or Variable Output Voltage" Ser. No. 444,730 filed 12/01/89;
"Switching Power Supply with Constant or Sinusoidal Input Current" Ser. No. 393,391 filed 08/14/89;
"Switching Power Supply Comprising Pair of Converters for Obtaining Constant or Sinusoidal Input Current and Fixed or Variable Output Voltage" Ser. No. 393,392 filed 08/14/89;
"Ultra Efficient Switching Power Amplifier" Ser. No. 363,213 filed 06/08/89;
"Synchronous Switching Power Supply Comprising Buck Converter" Ser. No. 363,325 filed 06/08/89;
"Synchronous Switching Power Supply Comprising Boost or Flyback Converter" Ser. No. 363,326 filed 06/08/89;
"Synchronous Switching Power Supply with Boost and/or Flyback Converters" Ser. No. 363,327 filed 06/08/89;
"High Power Switching Power Supply" Ser. N o. 338,327 filed 04/17/89 herewith;
"High Power Switching Power Supply with High Power Factor" Ser. No. 304,508 filed 01/31/89;
"High Power Switching Power Supply Having High Power Factor" Ser. No. 304,509 filed 01/31/89;
"Power Switch Driver" Ser. N o. 229,914 filed 08/08/88;
"Synchronous Switching Power Supply with Flyback Converter" U.S. Pat. No. 4,853,837 dated 08/01/89;
"High Efficiency Power Amplifier Comprising Multilevel Power Supply" U.S. Pat. No. 4,871,980 dated 10/03/89;
"Switching Power Amplifier" U.S. Pat. No. 4,763,080 dated 08/09/88;
"Switching Circuits Performing Thyristor and Triac Functions" U.S. Pat. No. 4,845,391 dated 07/04/89;
"Switching Power Supply" U.S. Pat. No. 4,803,610 dated 02/07/89; and
"Switching Power Supply" U.S. Pat. No. 4,736,286 dated 04/05/88.
All inventions are by the same inventor.

BACKGROUND OF THE INVENTION

The invention relates to a power factor correction circuit (PFCC), particularly for power supply systems requiring high output power, high efficiency and high power factor. The PFCC converts AC, e.g. line, voltage into DC voltage and can be employed as pre-regulator of a switching power supply.

Power factor well defines performance of a switching power supply. It is a ratio of the output power over input power. The input power is input AC voltage multiplied by RMS input current. The power factor is often specified only for the PFCC. In fact, the power factor depends on efficiency of the entire device.

A conventional switching power supply converts AC energy source, e.g. line, into DC voltage. In particular, the line voltage is rectified and further applied to an input capacitor.

Charging the capacitor causes inrush current and surge currents every peak of the line voltage. Numerous interference suppressors and protection circuits are inevitable. Power factor is very poor.

A conventional PFCC employs boost switching circuit. Rectified line voltage is applied thereto. Switching frequency or pulse width modulation (PWM) varies in a large range. The voltage provided by the boost circuit is inherently greater than peak of the line voltage. The PFCC operates as a separate input unit. In particular, controllable switches of the PFCC must sustain a full output power of the switching power supply. Moreover, the inrush current is inevitable.

SUMMARY OF THE INVENTION

The present invention is intended to provide a PFCC having a high output power, high efficiency and high power factor. The PFCC converts AC, e.g. line, voltage into DC voltage. The high power and high efficiency are achieved by using diodes as only semiconductor devices conducting higher average currents. Average currents conducted by controllable switches may be 2 or more times smaller. A sinusoidal input current can be simulated. Inrush and surge currents are eliminated.

The output voltage of the PFCC inherently varies in a predetermined range. However, the very purpose of off-line switching power supplies is to provide regulated output voltage while the amplitude of the line voltage varies in a predetermined range. The PFCC may extend this range in order to significantly increase the efficiency. However, a minimum voltage provided by the PFCC may be independent of the line voltage amplitude. Due to a full wave rectification, a maximum frequency of the PFCC output voltage is equal merely two times the line frequency.

For instance, if value of a capacitor is large and a voltage stored therein is set to half the peak value of rectified line voltage, the output voltage varies in range 1:0.5, i.e. by 50%. Controllable switches operate 33% of the time and their average current is 3 times smaller than average output current of the PFCC. If the capacitor voltage is 70% of the peak value of rectified line voltage, the output voltage varies in range 1:0.7, i.e. by 30%. The controllable switches operate 50% of the time and their average current is 2 times smaller than average output current of the PFCC. Peak current of the controllable switches is also reduced.

In one embodiment the PFCC has input and output, and comprises a capacitive means for storing a DC voltage, a rectifying means coupled to the input for providing a first rectified signal to the capacitive means and a second rectified signal to the output, and a switching means for selectively applying the DC voltage to the output.

In another embodiment the PFCC has input and output and comprises a rectifying means coupled to the input for providing a rectified signal to the output, a capacitive means for storing a DC voltage, and a switching means for selectively coupling the capacitive means between the output and ground.

PFCC according to the present invention has input and output and comprises a first rectifying means coupled to the input for providing a first rectified signal, and a second rectified signal to the output, a capacitive means for storing a DC voltage, a charging means for selectively applying the first rectified signal to the capacitive means, and a second rectifying means for applying the DC voltage to the output.

There are three basic configurations for converting a DC input voltage into a DC output voltage. In particular, the output voltage of buck and boost converters is respectively lower and higher than the input voltage. Assuming positive input voltage, three components of these converters are connected to the input, ground and output, respectively:

buck converter—switch, anode of a diode and inductor; and boost converter—inductor, switch and cathode of a diode.

BRIEF DESCRIPTION OF THE DRAWINGS

The present invention will become more clear in conjunction with the accompanying figures throughout which similar references many denote similar parts and of which.

DETAILED DESCRIPTION OF THE INVENTION

Figure 1:
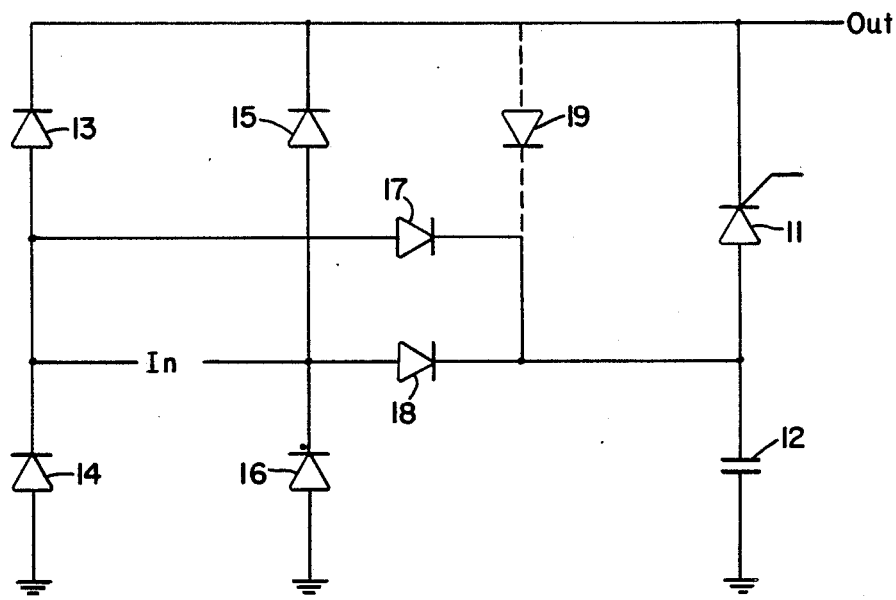
FIG. 1 is an embodiment of the PFCC with a thyristor for selectively applying a capacitor voltage to the output.

FIG. 1 is a first embodiment. The PFCC has an input and output. AC input voltage, e.g. line voltage, is applied to a rectifying means which provides one rectified signal to the output. Specifically, a full wave rectifier is employed which consists of the diodes 13 thru 16 each having one terminal coupled to line. Furthermore, cathodes of the diodes 13 and 15 are coupled to the output and anodes of the diodes 14 and 16 are coupled to ground. The capacitor 12 is also coupled to ground and stores a DC voltage. A switching means comprises an unidirectional switch for selectively applying the DC voltage to the output. Specifically, the thyristor 11 has anode coupled to the capacitor 12 and cathode coupled to the output.

Another rectified signal is provided by the rectifying means as to charge the capacitor 12. In one embodiment, the diodes 17 and 18 have anodes coupled to the input and cathodes coupled to the capacitor 12. In another embodiment, the diodes 17 and 18 are replaced by the diode 19 which has anode coupled to the output and cathode coupled to capacitor 12. The voltages at the output of the PFCC and across the capacitor 12 are positive.

A momentary value of the rectified input, i.e. line, voltage is referred to as V. In all present embodiments, V is always positive with reference to ground and varies from zero to the peak of the line voltage. It is also assumed that the PFCC delivers output current to a load.

When V is substantially equal to the voltage stored in the capacitor 12, the thyristor 11 is turned off inherently. The output voltage is equal V, wherein the diodes 13, 16 or 14, 15 conduct. The capacitor 12 is charged to the peak value of V, wherein the diode 17 or 18 conducts. The voltage across the thyristor 11 is substantially equal zero. If the diode 19 is substituted for the diodes 17 and 18, the capacitor 12 is charged via the diode 19. The reverse voltage across the thyristor 11 is equal merely to the voltage drop across the conducting diode 19. Inrush and surge currents flowing thru any diode can be significantly reduced by coupling an inductor in series with cathodes of the diodes 17 and 18 or 19.

When V is falling below a threshold, the thyristor 11 is turned on. The output voltage is increased from V to the peak value thereof stored in capacitor 12. The thyristor 11 conducts the output current of the PFCC, whereby any other diode is cut off. The thyristor 11 is automatically turned off when rising V is substantially equal to the actual voltage of the capacitor 12.

The choice of the threshold determines a range of the PFCC output voltage. For instance, if the threshold is set to half the peak value of V, the PFCC output voltage varies in range 1:0.5. The capacitor 12 is discharged only when the thyristor 11 is on and therefore delivers relatively small energy to the output. Consequently, an average current flowing thru the thyristor 11, diodes 17, 18 or 19 is relatively small. Moreover, the capacitor 12 can be discharged to half the peak value of V and therefore have a small capacitance. However, power failure condition must be also considered.

The efficiency of the PFCC is very high. The output current of the PFCC is conducted by the diode pair 13, 16 or 14, 15 or thyristor 11. Moreover, a maximum reverse voltage across the thyristor 11 is near zero and a transistor can be substituted therefor. The transistor, e.g. n-channel MOSFET, can also comprise integrated diode 19. The thyristor 11 and diode 19 are coupled in parallel and further in series with the capacitor 12. Obviously, the order of the series connection can be reversed as exemplified in FIG. 2.

Figure 2:
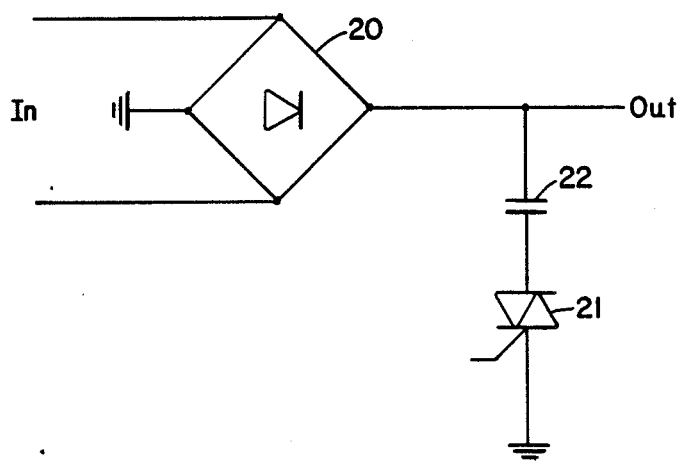
FIG. 2 is an embodiment of the PFCC with a triac for selectively coupling the capacitor to ground.

FIG. 2 is an embodiment of the PFCC in which inrush current is significantly reduced. AC input voltage, e.g. line voltage, is applied to a rectifying means which provides a rectified signal to the output. The full wave rectifier 20 is employed and may comprise diodes 13 thru 16 as shown in FIG. 1. The capacitor 22 is coupled to the output and stores a DC voltage. A switching means comprises a bidirectional switch for selectively coupling the capacitor 22 between the output and ground. Specifically, the triac 21 and capacitor 22 are coupled in series between the output and ground. The triac 21 is preferably coupled to ground rather than output, as to simplify a control circuit.

The triac 21 is turned on when V is rising and substantially equal to the voltage stored in the capacitor 22. In particular, when the supply first turns on, the triac 21 is turned on after first zero crossing of the line voltage, i.e. after V has reached zero. The maximum current flowing thru the triac 21 depends on the value of capacitor 22, wherein inrush current is significantly reduced. The output voltage is equal V and the capacitor 22 is charged to the peak value of V. Subsequently, the triac 21 is automatically turned off.

When V is falling below a threshold, the triac 21 is turned on. The output voltage is increased from V to the voltage stored in the capacitor 22. The triac 21 conducts the output current of the PFCC, whereby the diode bridge 20 is cut off. The triac 21 is automatically turned off when V is substantially equal to the actual voltage of the capacitor 22. Subsequently, the triac 21 is turned on if charging the capacitor 22 is necessary.

Figure 3:
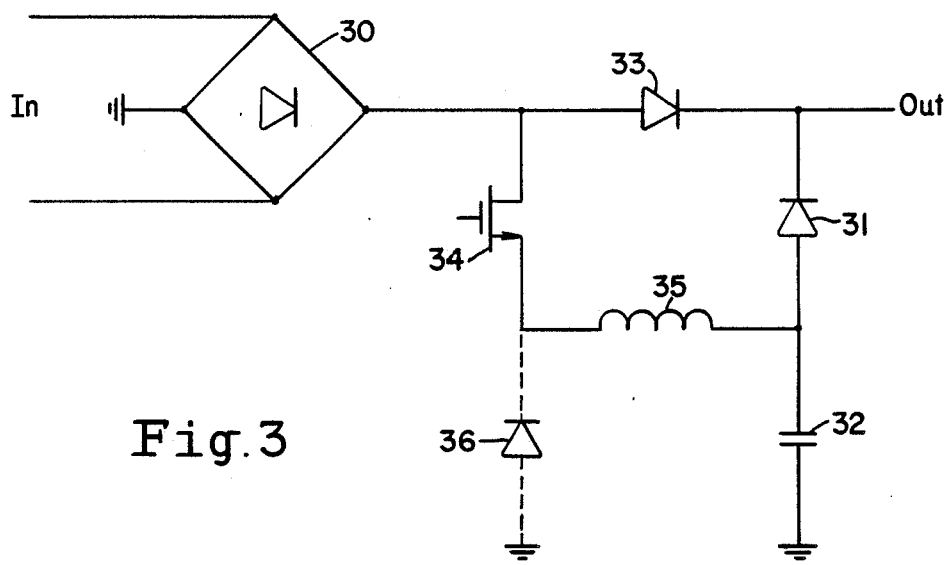
FIG. 3 is an embodiment of the PFCC with a buck converter for charging the capacitor.

FIG. 3 is an embodiment of the PFCC with capacitor charged to a predetermined voltage. The PFCC has an input and output. AC input voltage, e.g. line voltage, is applied to a first rectifying means which provides a first rectified signal, and a second rectified signal to the output. The full wave rectifier 30 provides the first rectified signal and may comprise diodes 13 thru 16 as shown in FIG. 1. The diode 33 is coupled to the first rectified signal and provides the second rectified signal. However, a pair of diodes, coupled as 17 and 18 of FIG. 1 or 47 and 48 of FIG. 4, can be substituted for the diode 33 as to provide the first rectified signal while the bridge 30 provides the second rectified signal.

The capacitor 32 is coupled to ground and stores a DC voltage. A charging means includes an unidirectional switch for selectively applying the first rectified signal to the capacitor 32. A second rectifying means consists of the diode 31 which has anode coupled to the capacitor 32 and cathode coupled to the output for applying the DC voltage thereto. Thus, a minimum output voltage of the PFCC is substantially limited to the DC voltage.

In one embodiment, the charging means includes the MOSFET 34 having drain coupled to the first signal and source coupled to the capacitor 32. The transistor 34 is turned on when V is rising and substantially equal to the voltage stored in the capacitor 32. In particular, when the supply first turns on, the transistor 34 is turned on after first zero crossing of the line voltage, i.e. after V has reached zero. The inrush current is significantly reduced. The output voltage is substantially equal V and the capacitor 32 is charged to V.

The transistor 34 can be turned off at any time so that the output voltage is rising to the peak value of V while the capacitor 32 retains a constant voltage. For instance, if the capacitor 32 has a large value and voltage stored therein is half the peak value of V, the PFCC output voltage varies in range 1:0.5. While the capacitor 32 is charged, the diode 33 conducts the output current of the PFCC and the diode 31 is cut off. The capacitor 32 is discharged when the voltage stored therein is higher than V. The diode 31 conducts the output current of the PFCC, whereby any other diode and the transistor 34 are cut off. Thus, a minimum output voltage of the PFCC is substantially limited to the DC voltage.

In another embodiment, the charging means further includes the inductor 35 which attains a current. The inductor 35 can be coupled in series with drain or, as shown, source of the transistor 34. The transistor 34 is shut off when charging of the capacitor 32 is unnecessary. Otherwise, the transistor 34 is turned on when V is falling and a difference between V and voltage stored in the capacitor 32 is positive and within a predetermined range. The voltage difference is applied across the inductor 35 which acts as current limiter. The transistor 34 is turned off when the inductor current reaches zero. This occurs before V reaches zero, whereby no sampling of the inductor current is necessary. Moreover, a thyristor can be substituted for the transistor 34, as shown in FIG. 4.

In yet another embodiment, the charging means further includes diode 36 having cathode coupled to a node, and anode coupled to ground. Consequently, the transistor 34 is selectively applying the first rectified signal to the node. The inductor 35 is coupled between the node and capacitor 32 for attaining a current. The components 34 thru 36 constitute a buck converter. In particular, the transistor 34 can be turned on and off at any time when the drain-source voltage is substantially greater than zero. The inrush current is eliminated.

When the transistor 34 is on, the inductor 35 and capacitor 32 are charged. The diode 36 is reverse biased. When the transistor 34 is turned off, the diode 36 conducts the current of the inductor 35 and the energy stored therein is delivered to the capacitor 32. The value thereof may be large as to consider the power failure condition. The capacitor voltage may be set e.g. to half the peak value of V, whereby the PFCC output voltage varies in range 1:0.5. The capacitor 32 is discharged only when the PFCC output voltage is smaller than the capacitor voltage and therefore delivers relatively small energy to the output. Consequently, an average current flowing thru the transistor 34 and diodes 31, 36 is relatively small.

Figure 4:
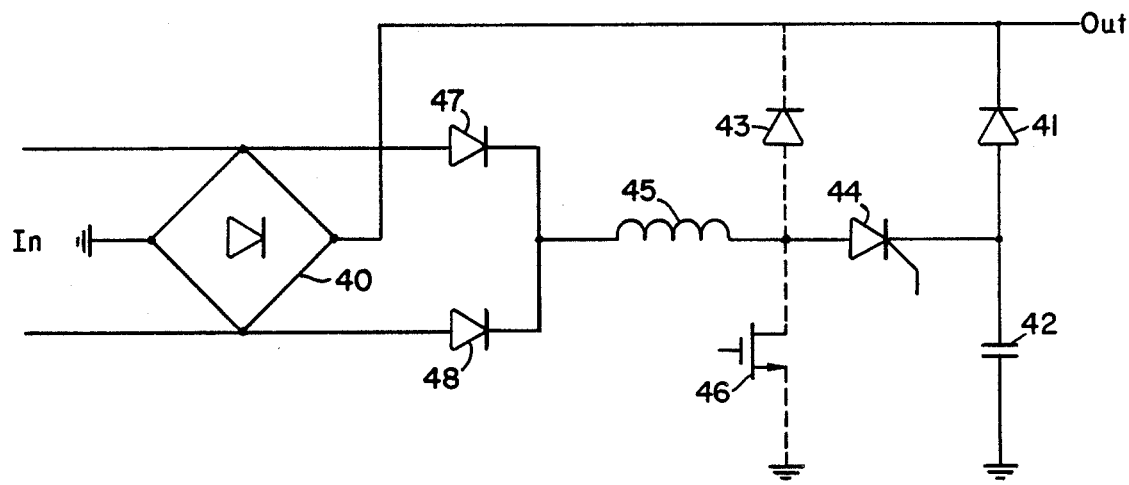
FIG. 4 is the preferred embodiment of the PFCC with a boost converter for simulating sinusoidal input current and charging the capacitor.

FIG. 4 is the preferred embodiment of the PFCC with a boost converter for simulating sinusoidal input current and charging the capacitor. The PFCC has an input and output. AC input voltage, e.g. line voltage, is applied to a first rectifying means which provides a first rectified signal, and a second rectified signal to the output. The full wave rectifier 40 provides the second rectified signal and may comprise diodes 13 thru 16 as shown in FIG. 1. The diodes 47 and 48 have anodes coupled to the input and cathodes tied together for providing the first rectified signal. However, a diode, coupled as 33 of FIG. 3, can be substituted for the diodes 47 and 48 as to provide the second rectified signal while the bridge 40 provides the first rectified signal.

The capacitor 42 is coupled to ground and stores a DC voltage. A charging means includes an unidirectional switch for selectively applying the first rectified signal to the capacitor 42. A second rectifying means consists of the diode 41 which has anode coupled to the capacitor 42 and cathode coupled to the output as to apply the DC voltage thereto. Thus, a minimum output voltage of the PFCC is substantially limited to the DC voltage.

In one embodiment, the charging means includes the thyristor 44 having anode coupled to the first rectified signal and cathode coupled to the capacitor 42. The inductor 45 can be coupled in series with cathode or, as shown, anode of the thyristor 44. The inductor 45 is superfluous if a current limiting can be obtained by means of an input line filter, not shown for simplicity. The thyristor 44 is shut off when charging of the capacitor 42 is unnecessary.

Otherwise, the thyristor 44 is turned on when V is falling and a difference between V and voltage stored in the capacitor 42 is positive and within a predetermined range. The voltage difference is applied across inductor 45 which acts as current limiter. The thyristor 44 is turned off automatically when the inductor current is near zero. This occurs before V reaches zero, whereby no sampling of the inductor current is necessary. Also, the inrush current is eliminated. The thyristor 44 can be replaced by a transistor, e.g. MOSFET 34 as shown in FIG. 3. Moreover, each of the diodes 47 and 48 can be replaced by a thyristor, wherein the thyristor 44 is superfluous. Modified rectifying bridges in which two rectifiers are displaced by thyristors are available in integrated form.

In another embodiment, the charging means includes a switching means for selectively coupling a node to the capacitor 42 and ground. Furthermore, the diode 43 couples the node to the second rectified signal, i.e. output of the PFCC. The inductor 45 is coupled between the first rectified signal and node for attaining a current. The switching means comprises a pair of switches coupled to the node and further separately coupled to the capacitor 42 and ground. Specifically, the n-channel MOSFET 46 has drain and source coupled to the node and ground respectively. The thyristor 44 has anode and cathode coupled to the node and capacitor 42 respectively.

The value of the capacitor 42 may be large as to consider power failure condition. The capacitor voltage may be set e.g. to half the peak value of V, whereby the PFCC output voltage varies in range 1:0.5. The capacitor 42 is discharged only when the PFCC output voltage is smaller than the capacitor voltage and therefore delivers relatively small energy to the output. Consequently, an average current flowing thru any component but the diode bridge 40 is relatively small.

The components 43 thru 46 constitute a modified boost converter. When the transistor 46 is on, the inductor 45 is charged since V is applied thereacross. The diode 43 and thyristor 44 are reverse biased. The voltage applied across gate and source of the thyristor 44 is positive so that the thyristor 44 takes over the inductor current immediately after the transistor 46 is turned off. Otherwise, the diode 43 conducts the inductor current. The thyristor 44 can be turned on subsequently so that the energy stored in the inductor 45 is still delivered to the capacitor 42.

Generally, the diode 43 couples the node to the first or second rectified signal as to conduct the inductor current. If the diode 43 is coupled between the node and first rectified signal, i.e. across the inductor 45, the energy stored therein will be dissipated in the diode 43 when the transistor 46 and thyristor 44 are open. FIG. 4 shows diode 43 coupled between the node and output so that the portion of the inductor energy is delivered to the load. If the PFCC operates with no load or insufficient load, the diode 43 should be connected across the inductor 45 in order to avoid output voltage spikes.

The PFCC input current, i.e. line current, is essentially a sum of the inductor current and current provided by diode bridge 40. The diode bridge 40 provides the PFCC output current when V is substantially higher than the voltage across the capacitor 42. Otherwise, the diode 41 conducts and the capacitor 42 delivers the output current. However, the boost converter operates when V is smaller than the capacitor voltage. Therefore, line still delivers the current if the transistor 46 is switched to attain the inductor current. The sinusoidal input current can be simulated. The power factor is very high.

The transistor 46 can be turned on and off at any time. Moreover, the thyristor 44 can be turned on when V is higher than the voltage across the capacitor 42 in order to charge it and better simulate the sinusoidal input current. The thyristor 44 is automatically turned off when transistor 46 is turned on. A transistor coupled in series with a diode can be substituted for the thyristor 44 as to avoid the additional switching of the transistor 46 and increase efficiency. Also a high speed thyristor can be employed as disclosed in the aforementioned "Switching Circuits Performing Thyristor and Triac Functions" U.S. Pat. No. 4,845,391 dated 07/04/89 by the same inventor.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Switching apparatus having input and output, comprising:
   a rectifying means coupled to the input for providing a first and second rectified signals, wherein the second rectified signal is applied to the output;
   a capacitive means for storing a DC voltage;
   a charging means for selectively applying the first rectified signal to the capacitive means; and
   a diode means for applying the DC voltage to the output.

2. Apparatus of claim 1 wherein the rectifying means includes a full wave rectifier.

3. Apparatus of claim 1 wherein the rectifying means includes a second diode means coupled to the first rectified signal for providing the second rectified signal.

4. Apparatus of claim 1 wherein the first rectifying means includes a second diode means coupled to the input for providing the first rectified signal.

5. Apparatus of claim 1 wherein the charging means includes an unidirectional switch.

6. Apparatus of claim 5 wherein the unidirectional switch is a thyristor.

7. Apparatus of claim 1 wherein the charging means includes a series coupled inductive means for attaining a current.

8. Apparatus of claim 7 wherein the charging means includes:
   a node;
   a switching means for selectively applying the first rectified signal to the node; and
   a second diode means coupled to the node for applying the current to ground,
   wherein the inductive means is coupled between the node and capacitive means.

9. Apparatus of claim 7 wherein the charging means includes:
   a node;
   a switching means for selectively coupling the node to the capacitive means and ground; and
   a second diode means coupled to the node for applying the current to the rectifying means,
   wherein the inductive means is coupled between the first rectified signal and node.

10. Apparatus of claim 9 wherein the switching means includes a pair of switches coupled to the node and further separately coupled to the capacitive means and ground.

* * * * *